UNITED STATES PATENT OFFICE.

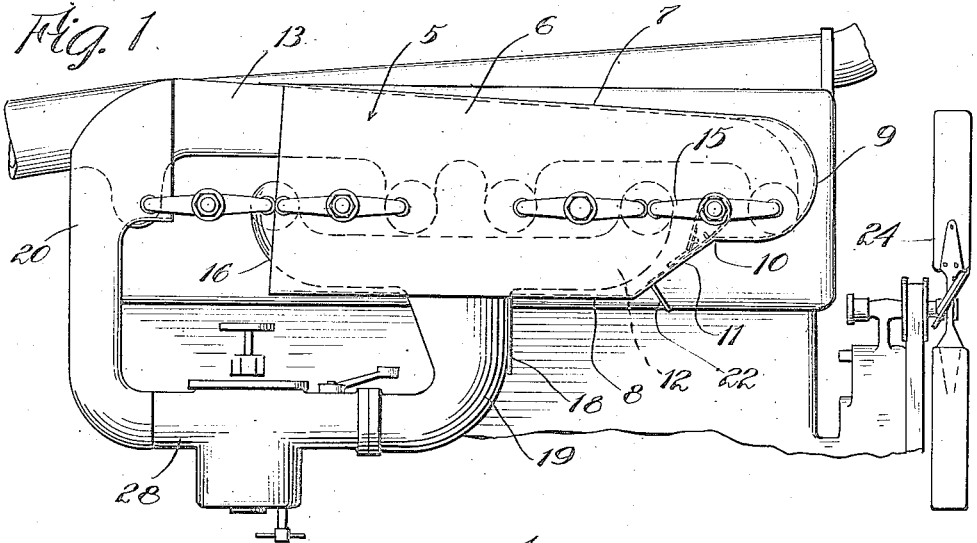
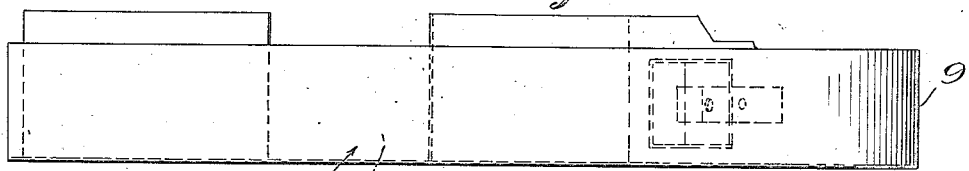
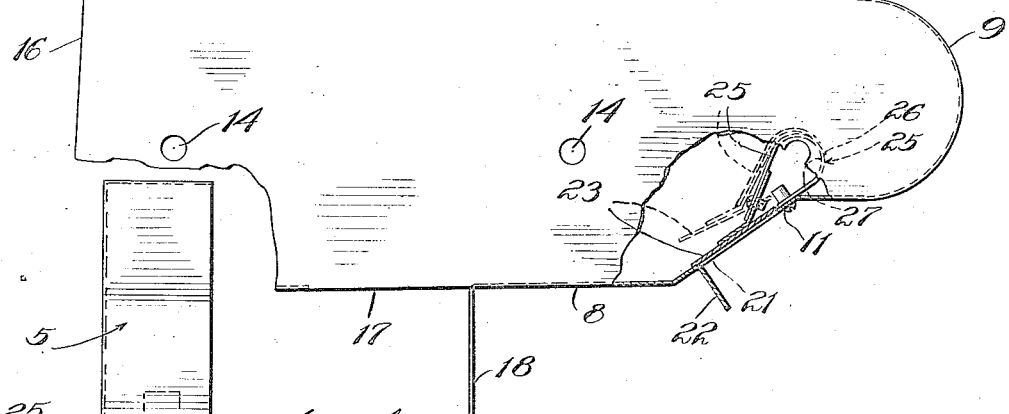
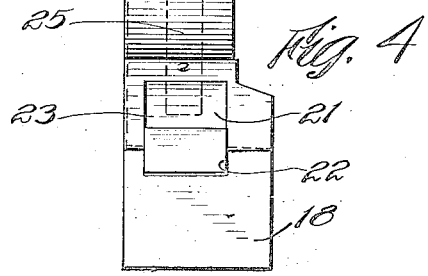
Inventor
Philip C. Huntly
By Miller Chindahl & Parker
Attys

PHILIP C. HUNTLY, OF CHICAGO, ILLINOIS.

MANIFOLD SHIELD.

1,416,352. Specification of Letters Patent. Patented May 16, 1922.

Application filed August 22, 1921. Serial No. 494,077.

*To all whom it may concern:*

Be it known that I, PHILIP C. HUNTLY, a citizen of the United States, residing at Chicago, in the county of Cook and State of Illinois, have invented certain new and useful Improvements in Manifold Shields, of which the following is a specification.

This invention relates to an improved manifold shield for automobile engines, more particularly to a protective shield and manifold heater adapted for the type of engines installed in Ford automobiles, and which is provided with means for automatically regulating the temperature of the air contained within the shield.

It is well known to the users of Ford and other cars having engines of similar construction that the currents of air produced by the motion of the car or by the fan of the motor tends, particularly in the winter season, to unduly cool off that portion of the intake manifold with which the said air currents come into direct contact so that the charge which passes therethrough often fails to ignite while the charges passing through other portions of the manifold not in direct contact with the relatively cool air currents do ignite readily. It is also known that moderate heating of the fuel mixture passing through the intake manifold to the cylinders facilitates efficient combustion, and that when the fuel mixture is cold or excessively hot upon entering the cylinders, the results are not satisfactory.

It is the primary object of this invention to provide a shield enclosing both exhaust and intake manifolds, which retains a sufficient portion of the heat radiated from the engine and particularly from the exhaust manifold to keep the air within the shield at a relatively high and uniform temperature, and which effectually prevents the relatively cool air currents from the fan coming into direct contact with the intake manifold so that the latter is maintained at a substantially uniform and sufficiently high temperature to deliver a combustible mixture of high efficiency to the cylinders.

Another object of the invention is to provide a shield having a thermostatically controlled valve for automatically admitting or excluding air of atmospheric temperature so that the air within the shield is maintained at a fairly uniform, constant and moderate temperature without any attention from the driver when operating the car in either hot or cold weather.

The invention consists in the novel construction and arrangement of parts to be hereinafter described and claimed for carrying out the above stated objects and such other objects as will appear from the following description of a certain preferred embodiment illustrated in the accompanying drawing, wherein—

Figure 1 is a side elevation of so much of an automobile engine as is necessary to illustrate the application thereof to the present invention;

Fig. 2 is a top plan view, detached, of the shield on an enlarged scale;

Fig. 3 is a side elevational view, detached, of the shield on the same scale as used for Fig. 2, and having a fragmentary portion of the side wall removed to more clearly show the valve in the front end thereof; and Fig. 4 is a front end elevational view of the shield as shown in Fig. 3.

Similar characters designate like parts in all the figures of the drawings.

In the preferred embodiment of the invention as described in the drawings there is provided a shield 5 composed largely of a single sheet of metal stamped and cut to include an outer vertical side wall 6, top and bottom walls 7 and 8, respectively, and a generally arcuate end wall 9. The end wall 9 extends rearwardly to 10 where it is bent down to provide an inclined portion 11, thence continuing to form the bottom wall 8 referred to above, it being of course readily appreciated that the shield might be made as a casting. The size and shape of the shield is such as to readily permit the same to substantially completely embrace or house both the intake and the exhaust manifolds 12 and 13, respectively. The side wall 6 of the shield is provided with several spaced apertures 14 for the reception of the legs of the conventional retaining clamps 15 now generally employed in securing the manifolds to the engine. These clamps thus serve to retain the shield also, and thereby provide easily detachable means by which the shield is rigidly held in place against the motor and over the manifolds without rattling. The rear end 16 of the shield is left open to permit the discharge of air from the shield.

The bottom wall 8 is cut away to provide an elongated opening 17 and a downwardly directed plate 18 which lies before the front of the vertical portion 19 of the intake manifold, thus serving to prevent material cooling of the mixture passing therethrough from the direct impinging of the cold air currents thereon. The side, top and bottom walls are of such length that the shield terminates with the rear open end 16 at a relatively short distance in front of an air intake member or stove 20 which receives warm air for the carburetor from about the heated surface of the exhaust manifold. The heated air passing from the shield over the mouth of the stove 20 aids in the maintenance of the supply of warmed air to the carburetor.

The inclined portion 11 of the end wall 9 is formed with an opening 21 from the lower edge of which projects deflecting plate 22 arranged to induce the passage of the cool air currents from the front through said opening 21.

A flap valve 23, which is mounted on the inclined portion 11 over the opening 21, provides a means for closing the shield opening 21 against the backwardly directed air currents which are produced by the motion of the car and the operation of the fan. The valve is automatically operated by a bimetallic thermostatic element 25 attached at one end to the valve and at the other end to the wall 11, and comprising an outer strip 26 and an inner strip 27 in close contact and composed of different materials. The material of which the strip 26 is composed has a smaller coefficient of expansion than has the material of the strip 27 so that a rise of temperature within the shield causes the element 25 to straighten out, and when a certain predetermined temperature is reached, the valve opens and admits the relatively cool outside air currents thereby lowering the temperature. As the temperature falls, the unequal contraction of the strips tends to increase the curvature of the element 25 thereby closing the valve when the temperature drops to the said predetermined point.

Thus it will be seen that a shield has been provided which protects the intake manifold of internal combustion engines of the automobile type from cold air currents, and uniformly heats the fuel mixture passing therethrough, the said shield being provided with a valve which operates automatically to keep the temperature of the atmosphere within the shield and immediately surrounding the manifolds at a moderately high and uniform degree while the engine is in operation.

I claim as my invention:

1. A shield adapted to partially enclose the intake and exhaust manifolds of an internal combustion engine, and a thermostatically controlled valve therein for automatically admitting or excluding outside air to maintain uniform temperature within said shield.

2. The combination with an internal combustion engine having intake and exhaust manifolds and having means at one end of the engine adapted to direct air currents toward the engine, of a shield partially enclosing said manifolds and having a closed wall near said means, and a themostatically controlled valve in said front wall adapted to admit or exclude the air currents directed by the said means in accordance with the variations of temperature within the shield.

3. A shield adapted to partially enclose the intake and exhaust manifolds of an internal combustion engine and having an opening in the front wall thereof, deflecting means proximate to said opening for directing air therethrough, a valve controlling said opening, and thermostatic means for automatically actuating said valve.

4. In a device of the class described the combination of a shield comprising a side wall, a closed top wall, a partially closed bottom wall, and a front wall, said front wall having a thermostatically operated valve for automatically opening and closing the front of the shield so as to admit or exclude relatively cold air currents.

5. A device of the class described comprising a shield adapted to partially enclose the intake and exhaust manifolds of an internal combustion engine, said shield effecting a substantial closure about its top, front and bottom sides with the adjacent wall of said engine, and having a valve orifice in the front side thereof, a valve member adapted to control said orifice, and a thermostatic actuating element for said valve comprising a bimetallic bar positioned within said shield and having one end fixed thereupon, the other end being operatively connected to said valve member.

In testimony whereof, I have hereunto set my hand.

PHILIP C. HUNTLY.